United States Patent
Park

(10) Patent No.: US 9,776,670 B2
(45) Date of Patent: Oct. 3, 2017

(54) FRONT VEHICLE BODY REINFORCING STRUCTURE AND ASSEMBLING METHOD THEREOF

(71) Applicants: Hyundai Motor Company, Seoul (KR); Kia Motors Corporation, Seoul (KR)

(72) Inventor: KiBong Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 52 days.

(21) Appl. No.: 14/868,913

(22) Filed: Sep. 29, 2015

(65) Prior Publication Data

US 2016/0272252 A1 Sep. 22, 2016

(30) Foreign Application Priority Data

Mar. 17, 2015 (KR) .......................... 10-2015-0036777

(51) Int. Cl.
*B62D 25/14* (2006.01)
*B62D 65/02* (2006.01)

(52) U.S. Cl.
CPC ............. *B62D 25/14* (2013.01); *B62D 65/02* (2013.01)

(58) Field of Classification Search
CPC ....... B62D 25/14; B62D 65/02; B62D 21/152
USPC ........................................................... 296/70
See application file for complete search history.

(56) References Cited

U.S. PATENT DOCUMENTS

| 7,004,534 | B2* | 2/2006 | Yoshii | B62D 25/081 |
| | | | | 180/274 |
| 7,025,411 | B2* | 4/2006 | Dettinger | B62D 25/14 |
| | | | | 296/193.02 |
| 9,033,400 | B2* | 5/2015 | Sasaki | B62D 25/08 |
| | | | | 296/187.09 |
| 9,216,770 | B2* | 12/2015 | Delord | B62D 25/081 |
| 2013/0214558 | A1 | 8/2013 | Lohmann et al. | |
| 2015/0008703 | A1* | 1/2015 | Furusaki | B62D 21/152 |
| | | | | 296/187.08 |
| 2015/0145284 | A1* | 5/2015 | Nishida | B62D 25/2036 |
| | | | | 296/187.1 |
| 2016/0052561 | A1* | 2/2016 | Atsumi | B62D 25/2018 |
| | | | | 296/187.08 |

FOREIGN PATENT DOCUMENTS

KR 10-2006-0027380 A 3/2006

* cited by examiner

*Primary Examiner* — Pinel Romain
(74) *Attorney, Agent, or Firm* — Morgan, Lewis & Bockius LLP

(57) ABSTRACT

A front vehicle body reinforcing structure may include a dash panel configured to partition an engine room and a passenger room, front side members deployed at both left and right sides in a width direction of a vehicle, formed to extend in a longitudinal direction of the vehicle, and having rear portions coupled to an outer surface of the dash panel, and a dash upper reinforcing member overlapped with an inner surface of the dash panel to be coupled together with the front side member.

10 Claims, 5 Drawing Sheets

FRONT VEHICLE BODY REINFORCING STRUCTURE AND ASSEMBLING METHOD THEREOF

CROSS-REFERENCE TO RELATED APPLICATION

The present application claims priority to Korean Patent Application No. 10-2015-0036777 filed Mar. 17, 2015, the entire contents of which is incorporated herein for all purposes by this reference.

BACKGROUND OF THE INVENTION

Field of the Invention

The present invention relates to a front vehicle body reinforcing structure, and more particularly, to a front vehicle body reinforcing structure improving front collision response performance of a vehicle by increasing connection rigidity of a rear portion and a dash panel in the longitudinal direction of the vehicle of a front pillar, and an assembling method thereof.

Description of the Related Art

In general, front pillars among components constituting a front vehicle body are structures that serve to mount and support a front door and serve as pillars that are deployed at both left and right sides in the width direction of the vehicle at a front side in the longitudinal direction of the vehicle to integrally connect a front upper portion and a front lower portion of a vehicle body.

A dash panel is a vehicle body member that partitions an engine room provided at a front side in the longitudinal direction of the vehicle and a passenger room provided at a rear side thereof.

Front side members are formed to extend in the longitudinal direction of the vehicle and deployed at both left and right sides in the width direction of the vehicle to increase structural strength of a front vehicle body, strongly support the front vehicle body when a collision accident of the vehicle occurs, and absorb and reduce a front collision impact to protect a passenger.

A rear portion of the front side member in the longitudinal direction of the vehicle is coupled to a rear lower member that is formed to extend in the longitudinal direction of the vehicle and the dash panel.

When the vehicle having the front vehicle body structure in the related art collides with the front, the front side member receives the collision impact to be pushed to the rear side in the longitudinal direction of the vehicle and in this case, since the dash panel coupled with the rear portion of the front side member just has a panel shape with a larger area than a thickness, the rear pushing of the front side member cannot be strongly supported and further, the dash panel is pushed toward the passenger room by the rear pushing of the front side member and the rear portion of the front side member is lifted in the height direction of the vehicle to aggravate a dipping phenomenon of the vehicle body, and as a result, it is insufficient to more safely protect the passenger. Therefore, structural strength thereof needs to be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front vehicle body reinforcing structure which can reduce a dipping phenomenon of a vehicle body when a front collision accident of a vehicle occurs by increasing connection strength of a rear portion of a front side member in the longitudinal direction of the vehicle and a dash panel and more safely protect a passenger who rides in a passenger room by reducing deformation of the dash panel toward the passenger room, and an assembling method thereof.

According to various aspects of the present invention, a front vehicle body reinforcing structure may include a dash panel configured to partition an engine room and a passenger room, front side members deployed at both left and right sides in a width direction of a vehicle, formed to extend in a longitudinal direction of the vehicle, and having rear portions coupled to an outer surface of the dash panel, and a dash upper reinforcing member overlapped with an inner surface of the dash panel to be coupled together with the front side member.

The front vehicle body reinforcing structure may further include front pillars formed to extend in a height direction of the vehicle and coupled to both left and right edges of the dash panel in the width direction of the vehicle, in which one fore-end of the dash upper reinforcing member may be coupled to the front pillar.

The dash upper reinforcing member may have an "L" shape.

The dash upper reinforcing member may be coupled to the dash panel so as to form a closed box space between the dash upper reinforcing member and the dash panel.

Each of the front pillars may include a front side upper member and a front side lower member which are coupled to each other to form a cross-section having a closed box shape, and the dash upper reinforcing member may be attached to an inner member of the front pillar.

A side outer extension member may be coupled to the dash panel, and a rear portion of the front side lower member in the longitudinal direction of the vehicle may be coupled to the side outer extension member.

A dash cross reinforcing member formed to extend in a width direction of the dash panel may be attached onto an inner surface of the dash upper reinforcing member, which is configured to face the engine room.

The dash cross reinforcing member may be overlapped with the dash panel to be integrally coupled to the dash panel together with the side outer extension member.

The dash cross reinforcing member may be coupled to the dash panel so as to form a closed box space having a predetermined size between the dash cross reinforcing member and the dash panel.

The front pillar may include an extension flange which is curved and extended outward in the width direction of the vehicle, and the extension flange may be overlapped with and coupled to the front pillar inner member.

An assembly method of a front vehicle body may include manufacturing each of a dash panel, a dash upper reinforcing member, a dash cross reinforcing member, and a front pillar inner member, coupling the dash panel, the dash upper reinforcing member, the dash cross reinforcing member, and the front pillar inner member to form a dash complete assembly, manufacturing each of a fender apron, a front side member, a side outer extension member, and a rear lower member, coupling the fender apron, the front side member, the side outer extension member, and the rear lower member to form a front pillar complete assembly, and coupling the front pillar complete assembly and the dash complete assembly.

According to various embodiments of the present invention, in a front vehicle reinforcing structure, the rear portion of the front side member is coupled to a predetermined portion of the outer surface of the dash panel, the dash upper reinforcing member is attached onto the inner surface of the dash panel corresponding to the predetermined portion of the outer surface of the dash panel in order to reinforce the dash panel, one fore-end of the dash upper reinforcing member is connected to the front pillar to increase connection strength of the dash panel and the front side member by the dash upper reinforcing member while the rear portion of the front side member is coupled to the dash panel, and as a result, a push amount of the front side member toward the passenger room is reduced when a front collision accident of the vehicle occurs, thereby more safely protecting a passenger.

Further, the dash cross reinforcing member which is formed to extend in the width direction of the vehicle to be attached to the dash panel in order to reinforce transverse strength of the dash panel is coupled to the dash upper reinforcing member to support the dash upper reinforcing member, and as a result, the rear portion of the front side member is prevented from being lifted upward in the height direction of the vehicle when the front collision accident of the vehicle occurs to reduce a dipping amount of the vehicle body and further, the rear pushing of the dash panel is suppressed to more safely protect the passenger.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
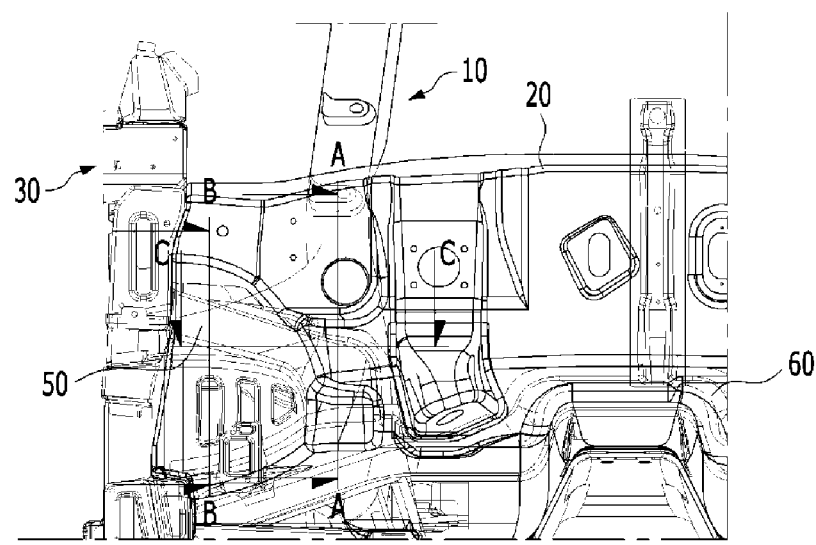
FIG. 1 is a perspective view of an exemplary front vehicle body reinforcing structure according to the present invention.

Referring to FIG. 1, a front vehicle body adopting a reinforcing structure according to various embodiments of the present invention may include front side members 10 which are formed to extend in the longitudinal direction of a vehicle, and deployed at both left and right sides in the width direction of the vehicle, a dash panel 20 which is formed to extend the width direction and the height of direction of the vehicle to partition an engine room and a passenger room and coupled with a rear portion of the front side member 10, and front pillars 30 which are coupled to both left and right edges of the dash panel 20 in the width direction of the vehicle, formed to extend in the height direction of the vehicle, and deployed at both left and right sides in the width direction of the vehicle.

Figure 2:
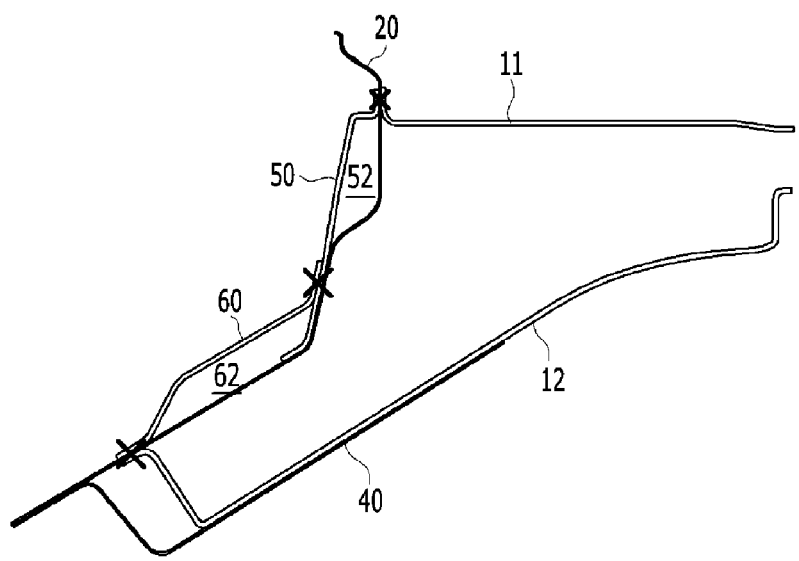
FIG. 2 is a cross-sectional view taken along line A-A of FIG. 1.
Figure 3:
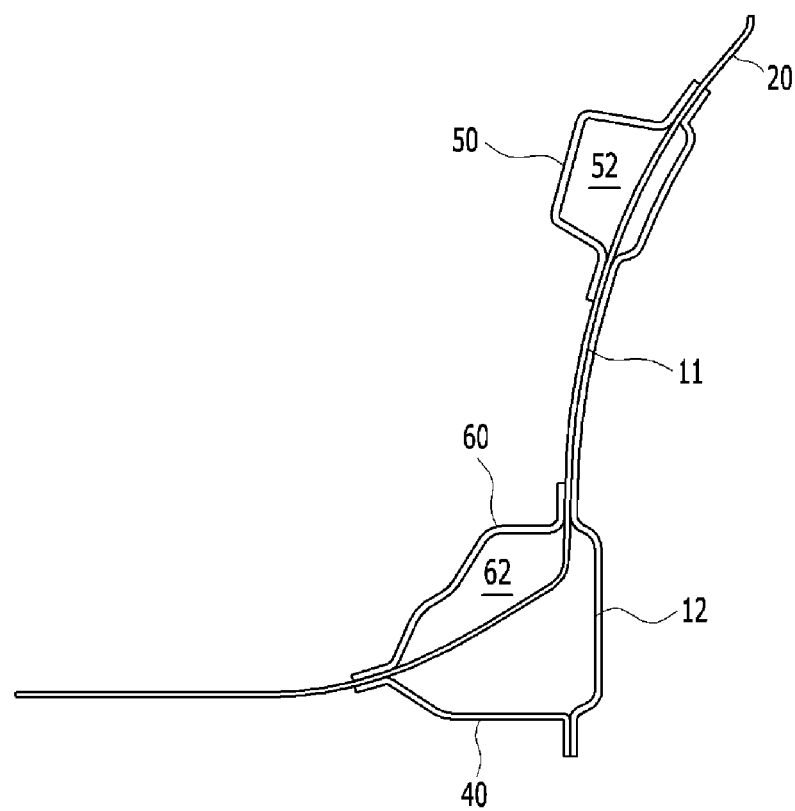
FIG. 3 is a cross-sectional view taken along line B-B of FIG. 1.

As illustrated in FIGS. 1 and 2, the front side member 10 may include a front side upper member 11 and a front side lower member 12 which are coupled to each other to have a cross-section with a substantially closed box shape.

A rear portion of the front side upper member 11 in the longitudinal direction of the vehicle is in close contact with an outer surface of the dash panel 20, which faces the engine room to be coupled by, for example, welding.

A rear portion of the front side lower member 12 may be coupled to a side outer extension member 40 coupled to the dash panel 20.

While the front side upper member 11 may be attached onto the outer surface of the dash panel 20, a dash upper reinforcing member 50 may be attached onto an inner surface of the dash panel 20, which faces the engine room.

That is, as illustrated in FIG. 2, an upper edge of the dash upper reinforcing member 50 in the height direction of the vehicle may be attached by the welding together while being triply overlapped with the dash panel 20 and the rear portion of the front side upper member 11.

A lower edge of the dash upper reinforcing member 50 in the height direction of the vehicle is also attached to the dash panel 20, and as a result, a closed box cross-sectional space 52 having a predetermined size may be formed between the dash panel 20 and the dash upper reinforcing member 50.

The dash upper reinforcing member 50 may be formed in a substantially "L" shape from the front view.

A partial portion between the upper and lower edges of the dash upper reinforcing member 50 may also be attached to the dash panel 20 and a dash cross reinforcing member 60 overlaps with an inner surface of the partial portion, which faces the engine room to be attached to the inner surface by for example, the welding.

That is, an upper edge of the dash cross reinforcing member 60 in the height direction of the vehicle may be integrally attached together through the welding while being triply overlapped with the dash panel 20 and the partial portion of the dash upper reinforcing member 50.

A lower edge of the dash cross reinforcing member 60 in the height direction of the vehicle may also be attached to the dash panel 20, and as a result, a closed box space 62 having a predetermined size may be formed between the dash cross reinforcing member 60 and the dash panel 20.

The lower edge of the dash cross reinforcing member 60 in the height direction of the vehicle may be integrally coupled together through the welding while being triply overlapped with the dash panel 20 together with the side outer extension member 40.

As illustrated in FIG. 1, the dash cross reinforcing member 60 may be formed to extend in the width direction of the dash panel 20, that is, in the width direction of the vehicle.

Figure 4:
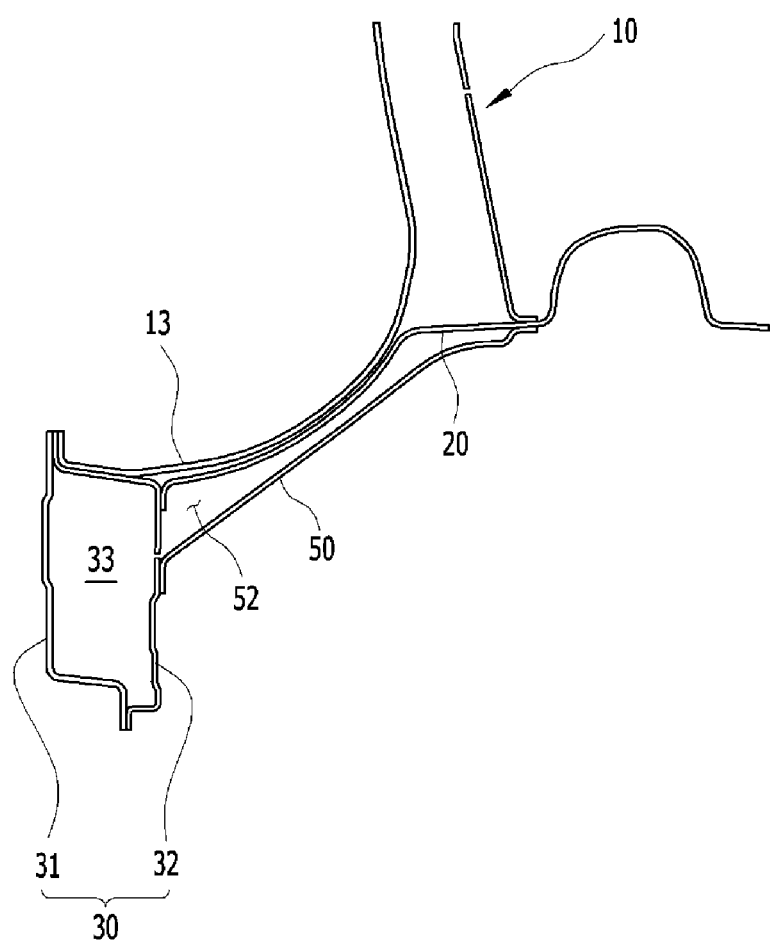
FIG. 4 is a cross-sectional view taken along line C-C of FIG. 1.

Referring to FIG. 4, the front pillar 30 may have a structure in which a front pillar inner member 32 is coupled to a front pillar outer member 31 so as to form a closed box space 33 having a predetermined size.

The dash upper reinforcing member 50 and the dash panel 20 are attached to an inner surface of the front pillar inner member 32 in the width direction of the vehicle to be integrally connected to the inner surface in the width direction of the vehicle.

Further, the front pillar 10 may include an extension flange 13 which is curved and extended outward in the width direction of the vehicle and the extension flange 13 may be coupled to the front pillar inner member 32 through the welding while being overlapped with the front pillar inner member 32.

The rear portion of the front side member 10 is coupled to a predetermined portion of the outer surface of the dash panel 20, the dash upper reinforcing member 50 is attached onto the inner surface of the dash panel corresponding to the predetermined portion of the outer surface of the dash panel 20 in order to reinforce the dash panel 20, and one fore-end of the dash upper reinforcing member 50 is connected to the front pillar 30 to increase connection strength of the dash panel 20, and the front side member 10 and the front pillar 30 by the dash upper reinforcing member 50 while the rear portion of the front side member 10 is coupled to the dash panel 20, and as a result, a push amount of the front side member 10 toward the passenger room is reduced when a front collision accident of the vehicle occurs, thereby more safely protecting a passenger.

Further, the dash cross reinforcing member 60 which is formed to extend in the width direction of the vehicle to be attached to the dash panel 20 in order to reinforce transverse strength of the dash panel 20 is coupled to the dash upper reinforcing member 50 to support the dash upper reinforcing member 50, and as a result, the rear portion of the front side member 10 is prevented from being lifted upward in the height direction of the vehicle when the front collision accident of the vehicle occurs to reduce a dipping amount of the vehicle body and further, the rear pushing of the dash panel 20 is suppressed to more safely protect the passenger.

Figure 5:
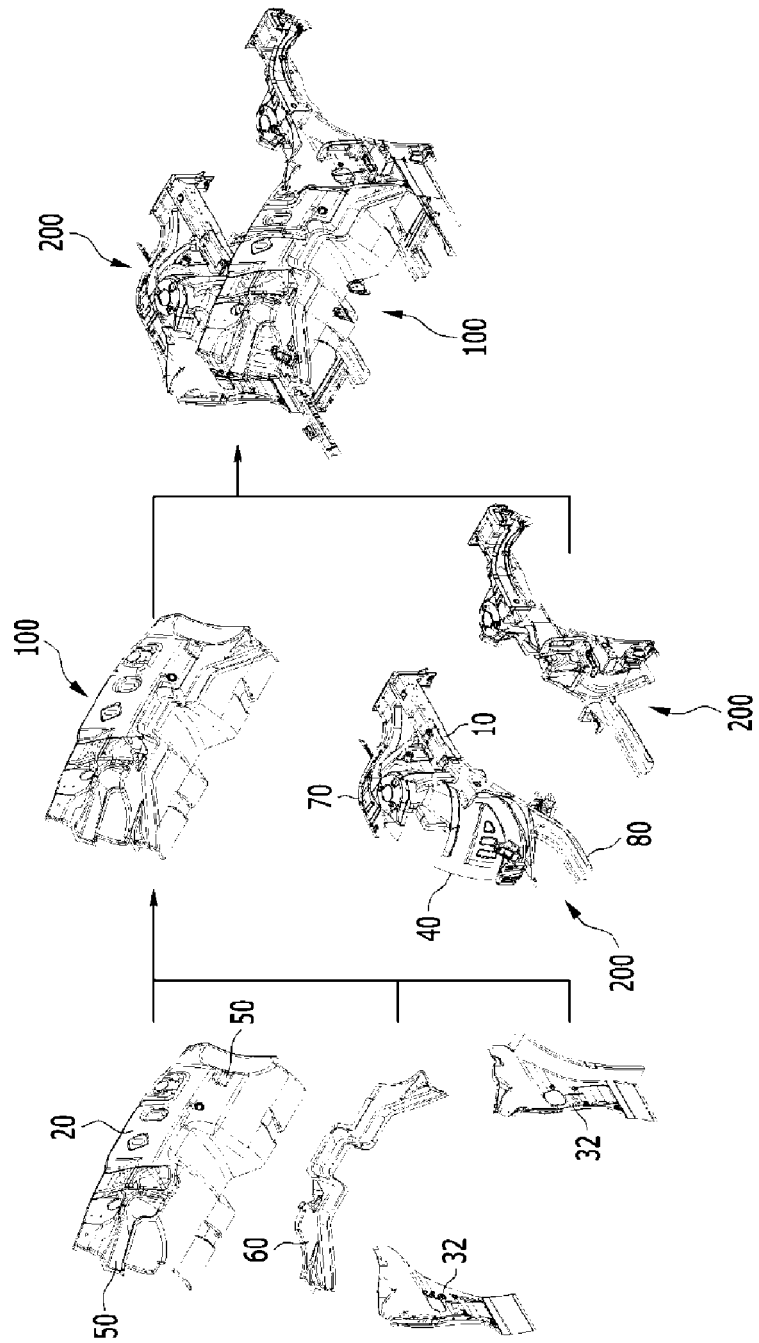
FIG. 5 is an assembly explanation diagram of the exemplary front vehicle body reinforcing structure according to the present invention.

Referring to FIG. 5, in an assembling sequence of the front vehicle body adopting the reinforcing structure according to various embodiments of the present invention, each of the dash upper reinforcing member 50 and the dash cross reinforcing member 60 are attached to the dash panel 20 and the front pillar inner member 32 is coupled to both left and right edges of the dash panel 20 to form a dash complete assembly 100.

In addition, the front side member 10, and the side outer extension member 40 and the rear lower member 80 are coupled to a fender apron 70 to form a front pillar complete assembly 200, and the front pillar complete assembly 200 and the dash complete assembly 100 are coupled to each other to form the front vehicle body.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body reinforcing structure comprising:
   a dash panel configured to partition an engine room and a passenger room;
   front side members positioned at both left and right sides in a width direction of a vehicle, formed to extend in a longitudinal direction of the vehicle, and having rear portions coupled to an outer surface of the dash panel; and
   a dash upper reinforcing member overlapped with an inner surface of the dash panel to be coupled together with the front side member,
   wherein a dash cross reinforcing member formed to extend in a width direction of the dash panel is attached onto an inner surface of the dash upper reinforcing member, which is configured to face the engine room.

2. The front vehicle body reinforcing structure of claim 1, further comprising:
   front pillars formed to extend in a height direction of the vehicle and coupled to both left and right edges of the dash panel in the width direction of the vehicle,
   wherein one fore-end of the dash upper reinforcing member is coupled to the front pillar.

3. The front vehicle body reinforcing structure of claim 2, wherein:
   the dash upper reinforcing member has an "L" shape.

4. The front vehicle body reinforcing structure of claim 1, wherein:
   the dash upper reinforcing member is coupled to the dash panel so as to form a closed box space between the dash upper reinforcing member and the dash panel.

5. The front vehicle body reinforcing structure of claim 2, wherein:
   each of the front pillars includes a front side upper member and a front side lower member which are coupled to each other to form a cross-section having a closed box shape, and
   the dash upper reinforcing member is attached to an inner member of the front pillar.

6. The front vehicle body reinforcing structure of claim 5, wherein:

a side outer extension member is coupled to the dash panel, and a rear portion of the front side lower member in the longitudinal direction of the vehicle is coupled to the side outer extension member.

7. The front vehicle body reinforcing structure of claim 1, wherein:

the dash cross reinforcing member is overlapped with the dash panel to be integrally coupled to the dash panel together with the side outer extension member.

8. The front vehicle body reinforcing structure of claim 1, wherein:

the dash cross reinforcing member is coupled to the dash panel so as to form a closed box space having a predetermined size between the dash cross reinforcing member and the dash panel.

9. The front vehicle body reinforcing structure of claim 5, wherein:

the front pillar includes an extension flange which is curved and extended outward in the width direction of the vehicle, and the extension flange is overlapped with and coupled to the front pillar inner member.

10. An assembly method of a front vehicle body, comprising:

manufacturing each of a dash panel, a dash upper reinforcing member, a dash cross reinforcing member, and a front pillar inner member;

coupling the dash panel, the dash upper reinforcing member, the dash cross reinforcing member, and the front pillar inner member to form a dash complete assembly;

manufacturing each of a fender apron, a front side member, a side outer extension member, and a rear lower member;

coupling the fender apron, the front side member, the side outer extension member, and the rear lower member to form a front pillar complete assembly; and coupling the front pillar complete assembly and the dash complete assembly.

\* \* \* \* \*